(12) United States Patent  
Wilson

(10) Patent No.: US 8,651,258 B2  
(45) Date of Patent: Feb. 18, 2014

(54) CONNECTION FOR A GRAIN BIN ALLOWING ROTATION OF THE SUPPLY/REMOVAL CHUTE

(75) Inventor: Gary W. Wilson, Elkton, KY (US)

(73) Assignee: WCH Industries, LLC, Elkton, KY (US)

( * ) Notice: Subject to any disclaimer, the term of this patent is extended or adjusted under 35 U.S.C. 154(b) by 191 days.

(21) Appl. No.: 13/404,199

(22) Filed: Feb. 24, 2012

(65) Prior Publication Data

US 2013/0175137 A1 Jul. 11, 2013

Related U.S. Application Data

(60) Provisional application No. 61/464,158, filed on Mar. 1, 2011.

(51) Int. Cl.  
*B65G 11/00* (2006.01)

(52) U.S. Cl.  
USPC .............................. 193/2 R; 193/15; 193/2 A

(58) Field of Classification Search  
USPC .............................. 193/2 A, 2 R, 4, 15, 22, 28  
See application file for complete search history.

(56) References Cited

U.S. PATENT DOCUMENTS

| 931,222 A | 8/1909 | Rosenthal |
| 2,808,295 A | 10/1957 | Caron |
| 3,105,722 A | 10/1963 | Thompson |
| 3,158,408 A | 11/1964 | Cymara |
| 3,582,145 A | 6/1971 | Janssen |
| 3,659,691 A * | 5/1972 | Leutelt ........................... 193/2 C |
| 3,899,088 A * | 8/1975 | Furuya et al. ................. 414/206 |
| 4,469,210 A * | 9/1984 | Blumer et al. .................. 193/22 |
| 4,577,805 A * | 3/1986 | Seymour ..................... 241/101.8 |
| 4,754,869 A * | 7/1988 | Hutchison et al. ............ 198/536 |
| 7,311,486 B2 * | 12/2007 | Gorza et al. ................... 414/301 |

FOREIGN PATENT DOCUMENTS

| GB | 2173488 | * 10/1986 | ............. B65G 11/00 |
| GB | 2173488 A | 10/1986 | |

* cited by examiner

*Primary Examiner* — Ramya Burgess  
*Assistant Examiner* — Thomas Randazzo  
(74) *Attorney, Agent, or Firm* — Philip E. Walker; Waddey Patterson

(57) ABSTRACT

A system and method for a transfer of material in a tube or chute from a first location at a first height to a second location at a second height. The system can increase the lifespan and usefulness of that chute by allowing an easy rotation that tube or chute with respect to its supply and distribution locations such that the requirement for heavy machinery is reduced or eliminated during the repositioning process. This system allows for the correct positioning of a unworn or underutilized location of that chute as the main support path for the material transport in that chute.

18 Claims, 15 Drawing Sheets

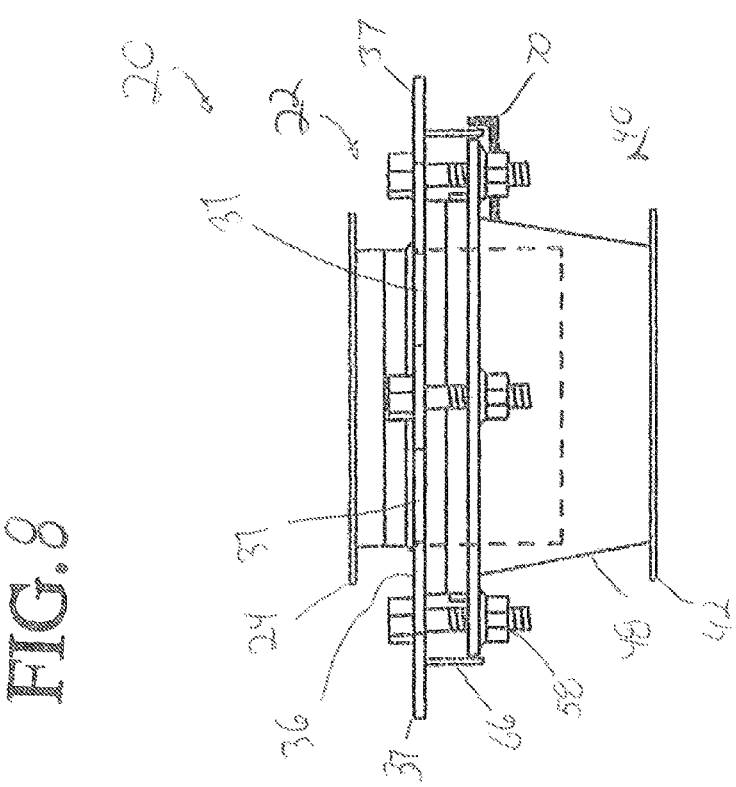
FIG. 8
FIG. 9

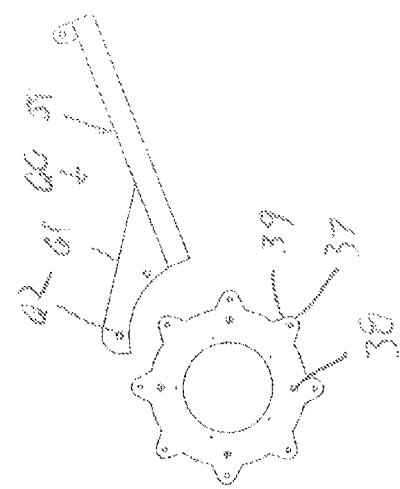
FIG. 14D
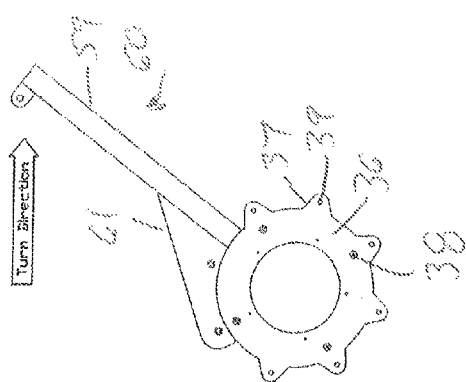
FIG. 14C
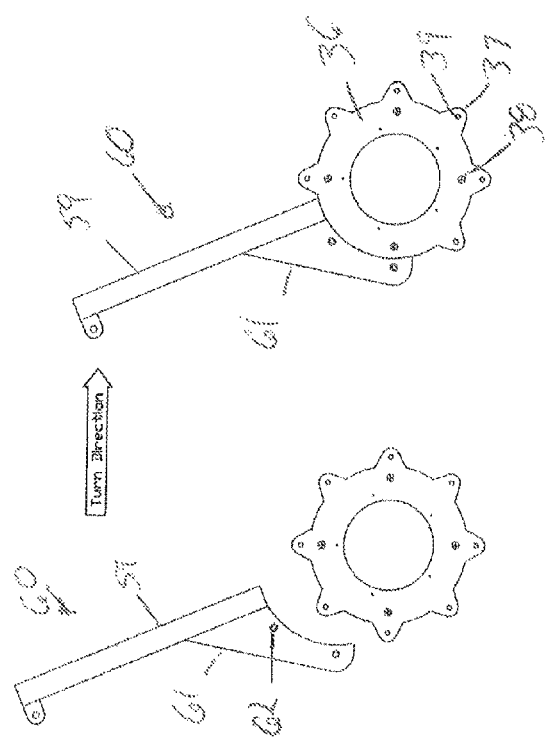
FIG. 14B
FIG. 14A

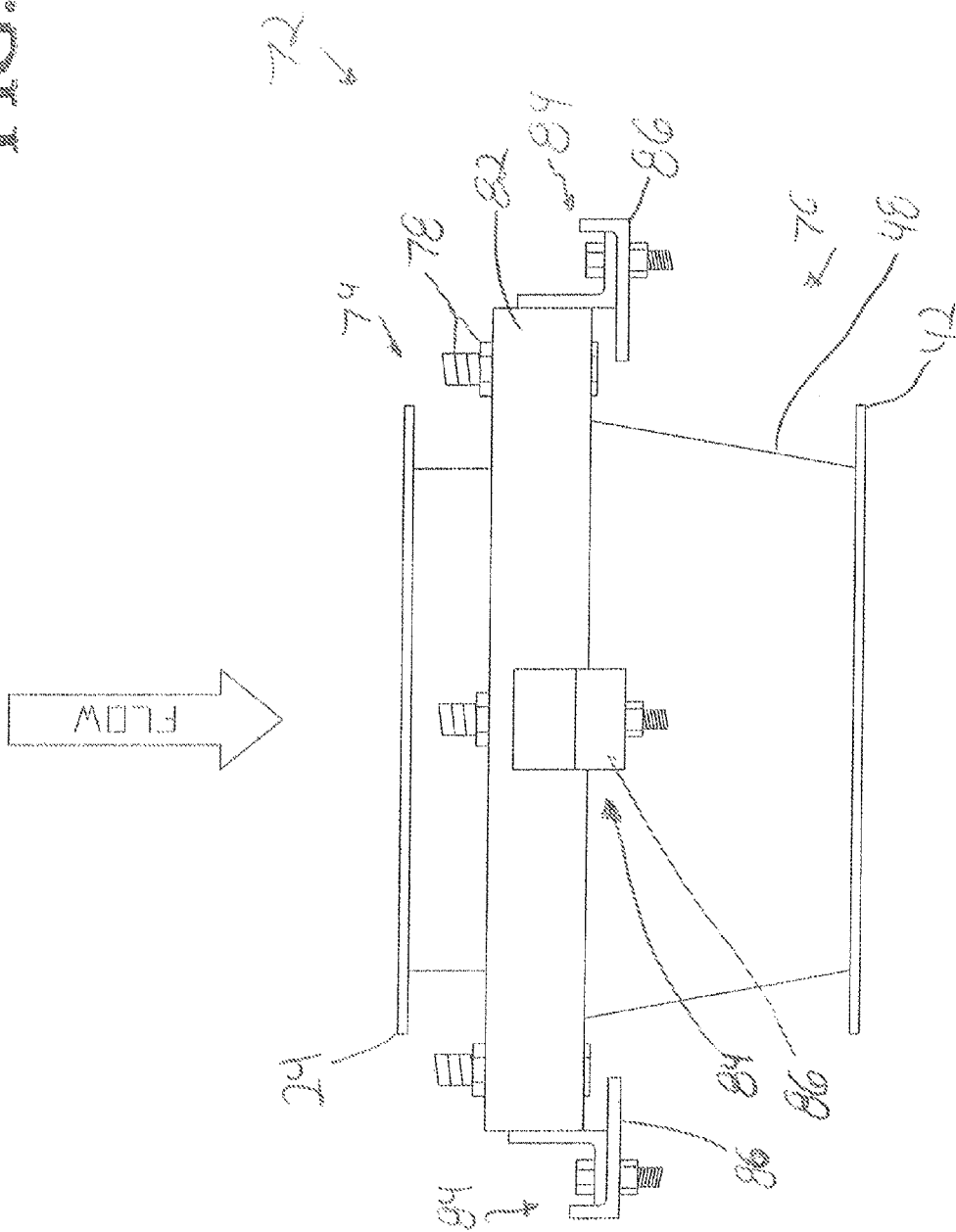

CONNECTION FOR A GRAIN BIN ALLOWING ROTATION OF THE SUPPLY/REMOVAL CHUTE

CROSS-REFERENCES TO RELATED APPLICATIONS

This application claims benefit of U.S. Provisional Application No. 61/464,158 entitled "The Twister 360, (Rotating Down Spout Fixture), filed Mar. 1, 2011.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present disclosure relates generally to an attachment for the transfer of material along a chute from a first location to a second location. More specifically, the present disclosure relates to a connection for supply chute, or tube, to a collection area that allows rotation of the supply chute relative to other aspects of the connection. More particularly, the present disclosure relates to an attachment system by which a supply chute can be rotated to even the use and/or wear on the chute from materials transferred along the chute.

2. Description of the Related Art

As appreciated by those of ordinary skill in the art, there are various methods and apparatuses used to transport materials from one location to the other. These methods and apparatus include various devices that carry and/or guide the materials during this travel. One specific transfer device is the use of a mechanical path, such as tube or chute. This movement is generally facilitated through a force, such as gravity or fluid propulsion, including water, air, and the like. This movement of the materials through the chute has a tendency to wear and weaken the chute itself due to the repeated stress of the flow of materials along that chute. This wear intensifies and increases when the materials so moved have an abrasion, which can include edges and/or sharp lines or points.

One industry in which this type of material movement is commonplace is in the agricultural industry. This includes the use of chutes, or downspouts, to move materials from varying heights. For example, grain elevators commonly use a chute to transport material, such as grain, from a higher location to a lower location.

As these chutes are used, over a period of time, which can range from week, months or years, gravity driven down spout chutes have a tendency to wear thin on the side on which the material contacts that chute. This wear is typically present on the internal bottom portion and is a direct result of the sliding of the agricultural product, for example grain, along that internal bottom portion. These chutes typically have a full cylinder shape that helps protect the materials transported within from external factors, such as weather (wind, rain, snow, etc) and animals. As such, the situation can occur when a portion of the chute wears while the remaining section remains in relatively new condition due to lack of contact with the transported material. In several instances, the worn portion can constitute as little as a third or a fourth of the overall diameter of the chute.

Conventionally, it is known in the art to rotate the chute to allow the extended use of that particular chute to prevent breaking of the chute caused by the continued contact between the material transported in the tube at the same location. Conventionally, this rotation requires a crane, or some type of large overhead supporting device, to suspend the tube in the air. Then a cutting device, such as a torch, will cut the welded ends of the chute free from the supply and collection locations. This disengages and physically separates the chute from the supply and collection locations, for example a grain bin or storage facility. Next, the tube then is rotated, again typically by another large overhead supporting machine, and then refastened to the supply and distribution locations. This refastening typically requires a rewelding of the ends of the chute to the distribution and collection bins. This process of suspension, cutting, rotating and rewelding is costly, time consuming and typically lacks accuracy in the rotation of the chute. This is because an owner can under or over rotate the chute and fail to properly use all of the chute's diameter and/or reuse worn areas causing an untimely break in the chute or a failure to properly use all of the chute. Either way, this conventional process defeats the actual purpose of rotating the tube in order to properly and successfully use the full internal diameter of the tube to transport the materials.

What is needed then is a system and method of transferring materials along a tube or chute from a first location at a first site to a second location at a second site. The system should maximize the lifespan and usefulness of that chute. Preferably, this system allows for an easy movement of that tube or chute with respect to its supply and distribution locations such that the requirement for heavy machinery is reduced or eliminated during the repositioning process. Preferably, this system allows for the correct positioning of a unworn or underutilized location of that chute as the main support path for the material transport in that chute. This needed system or method is presently lacking in the art.

BRIEF SUMMARY OF THE INVENTION

Included herein is a system and method for a transfer of material in a tube or chute from a first location at a first height to a second location at a second height. The attachment system can comprise a first connection including a top housing and a bottom housing. The top housing can have a top collar, a plurality of top fasteners, a top tubular section, and a top annular plate. The top collar can include a plurality of top collar attachment holes while each top fastener can be shaped to engage one of the top collar attachment holes and removably attach the top collar to the chute. A top tubular section can extend from the top collar and have a first diameter and an axis. The top annular plate can be affixed to the top tubular section and be spaced from a top collar. The top annular plate can include a plurality of top housing attachment apertures and a plurality of protrusions spaced around the top annular plate and extending removably outward from the axis.

The bottom housing can have a bottom collar, a plurality of bottom fasteners, a bottom tubular section, a bottom annular plate, and a plurality of connecting fasteners. The bottom collar can include bottom collar attachment holes and each bottom fastener can be shaped to engage one of the bottom collar attachment holes and removably attach the bottom collar to the second location. The bottom tubular section can extend from the bottom collar and have a mouth positioned opposite the bottom collar. The mouth can have a second diameter larger than the first diameter of the top tubular section. At least a portion of the top tubular section can be positionable within the mouth of the bottom tubular section. The bottom annular plate can be fixed to the bottom tubular section and spaced from the bottom collar and the bottom annular plate can include a plurality of bottom housing attachment apertures. Each connecting fastener can be shape to engage one of the top housing attachment apertures and one of the bottom housing attachment apertures to removably attach the top annular plate to the bottom annular plate.

A rotary tool having a plurality of securing locations is included and can be shaped to removably engage the plurality of protrusions on the top annular plate. The rotary tool is shaped to rotate the top housing independent of the bottom housing absent the plurality of connecting fasteners between the top annular plate and the bottom annular plate.

In another embodiment, the attachment system can include a second connection having a top housing, a bottom housing, and a plurality of connecting fasteners. The top housing can include a top collar shaped to engage the first location and a top tubular section extending from the top collar and having a first diameter and an axis. A top annular plate can be affixed to the top tubular section and spaced from a top collar. The bottom housing of the second connection can have a bottom collar shaped to engage the chute, a bottom tubular section extending from the bottom collar and a mouth position opposite the bottom collar. The mouth can have a second diameter larger than the first diameter so at least a portion of the top tubular section can be positionable within the mouth of the bottom tubular section. In addition, the bottom annular plate can be affixed to the bottom tubular section at allocation that is spaced from the bottom collar. The plurality of connecting fasteners can be shaped to removably attach the top annular plate to the bottom annular plate in the second connection.

It is therefore a general object of the present disclosure to provide an attachment system and method for the transfer of material along a chute.

Another object of the present disclosure is to provide an attachment system for the transfer of material along a chute from a first location at a first height to a second location at a second height.

Still another object of the present disclosure is to provide a transfer chute that can be readily detached from distribution and collection locations and rotated about its axis while still in place.

Yet another object of the present disclosure is to provide a chute that connects the distribution and collection locations that can be rotated about its axis with little to no need from additional suspension equipment.

Yet still another object of the present disclosure is to provide a method and apparatus that can maximize the use of the internal diameter of a transfer chute to increase the longevity of that transport chute.

Other and further objects, features and advantages of the present invention will be readily apparent to those skilled in the art upon reading the full disclosure when taken in conjunction with the accompanying drawings.

BRIEF DESCRIPTION OF THE SEVERAL VIEWS OF THE DRAWINGS

FIG. 8 is a partial cutaway of view of the connection shown in FIG. 4.

FIG. 9 is an assembly view of a first connection and portions of a chute and a collection location.

FIGS. 14A-D show the general steps of rotation of the top annular plate with FIGS. 14A and D depicting the attachment and separation of the rotary tool and the top annular plate with FIGS. B and C as showing rotation of the rotary tool and the top annular plate.

FIG. 15 is a side view of a second connection made in accordance with the current disclosure.

DETAILED DESCRIPTION OF THE INVENTION

Figure 1:
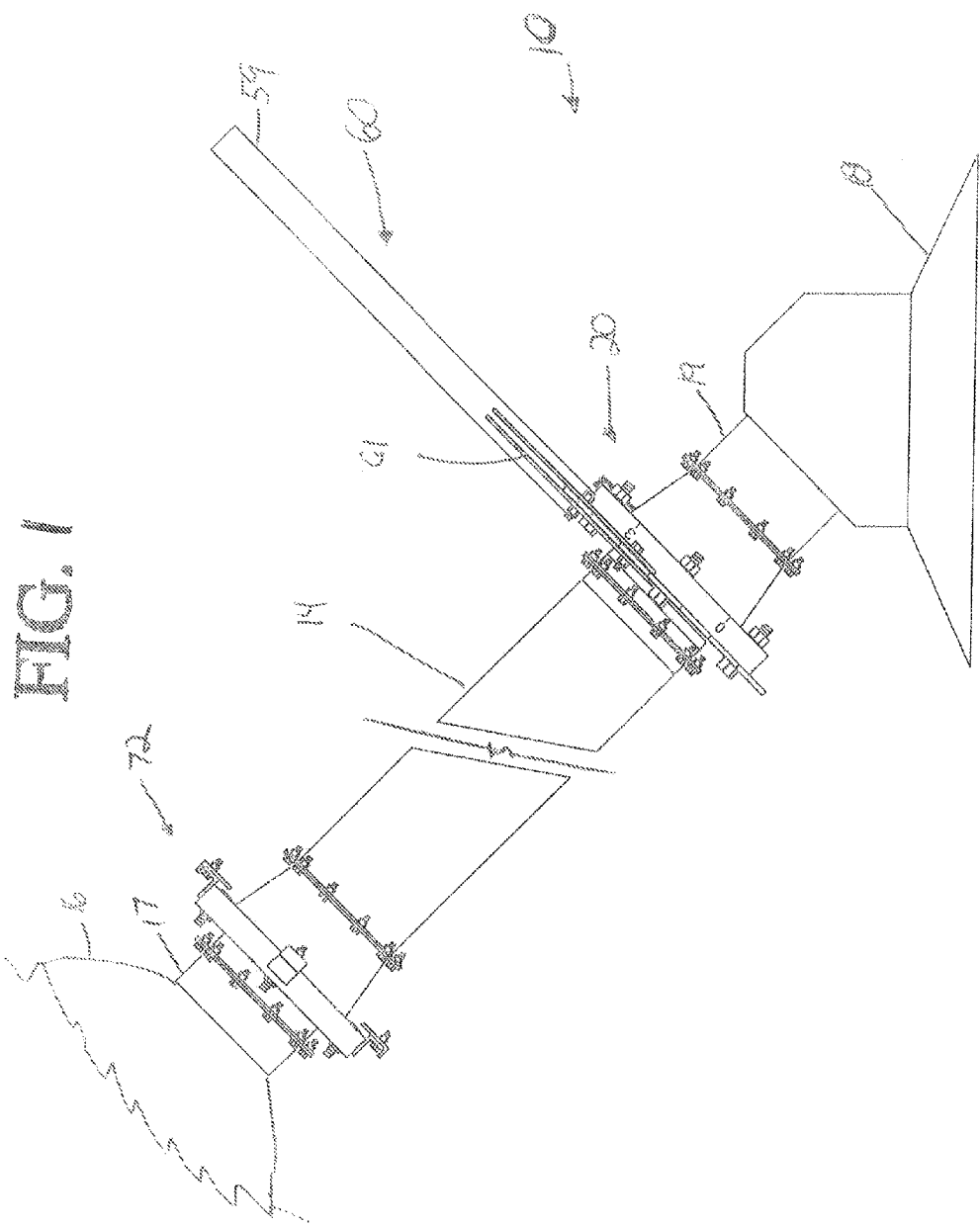
FIG. 1 is a side view of an embodiment of an attachment system made in accordance with the current disclosure.
Figure 2:
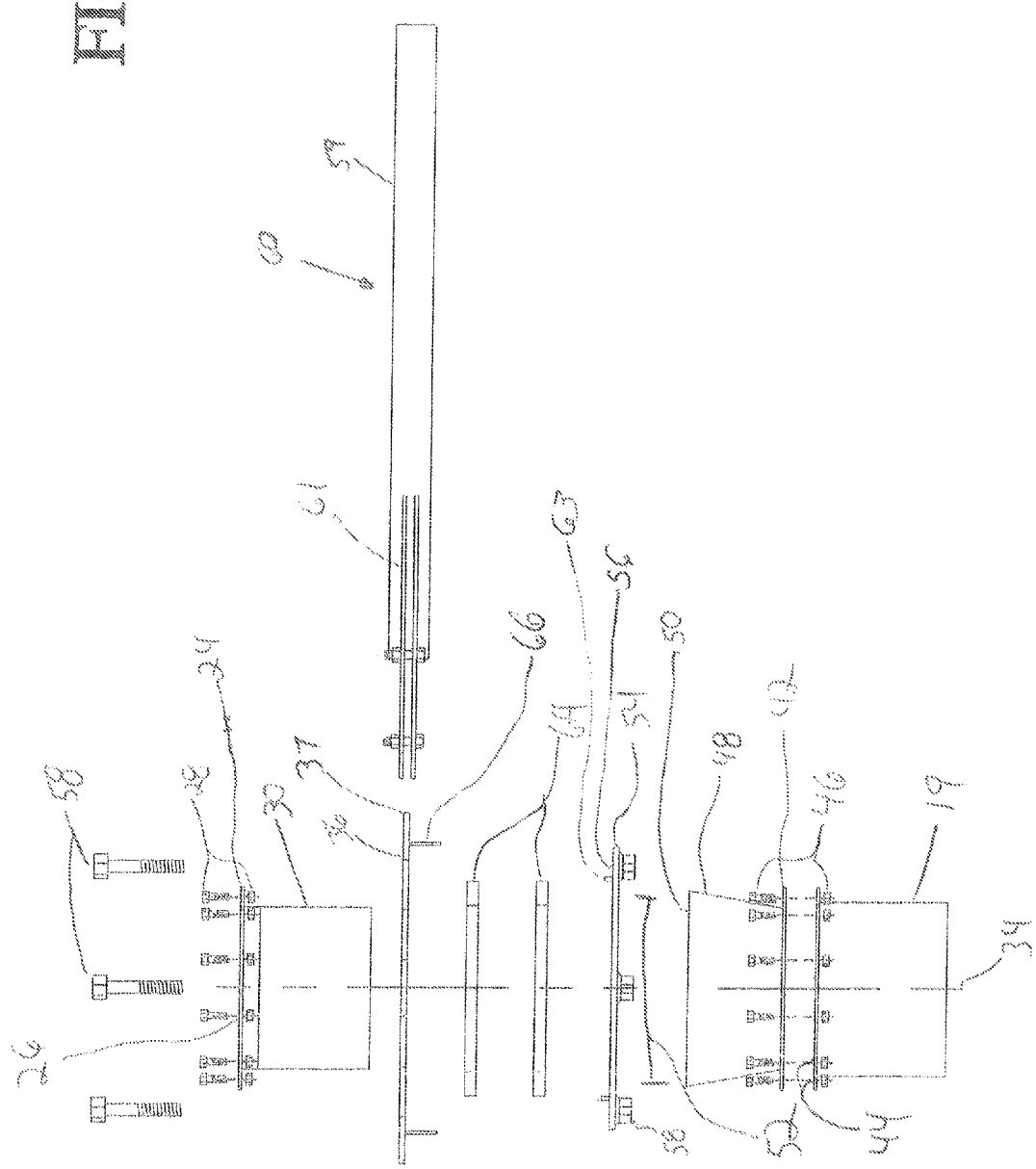
FIG. 2 is an expanded view of a first connection made in accordance with the current disclosure.
Figure 3:
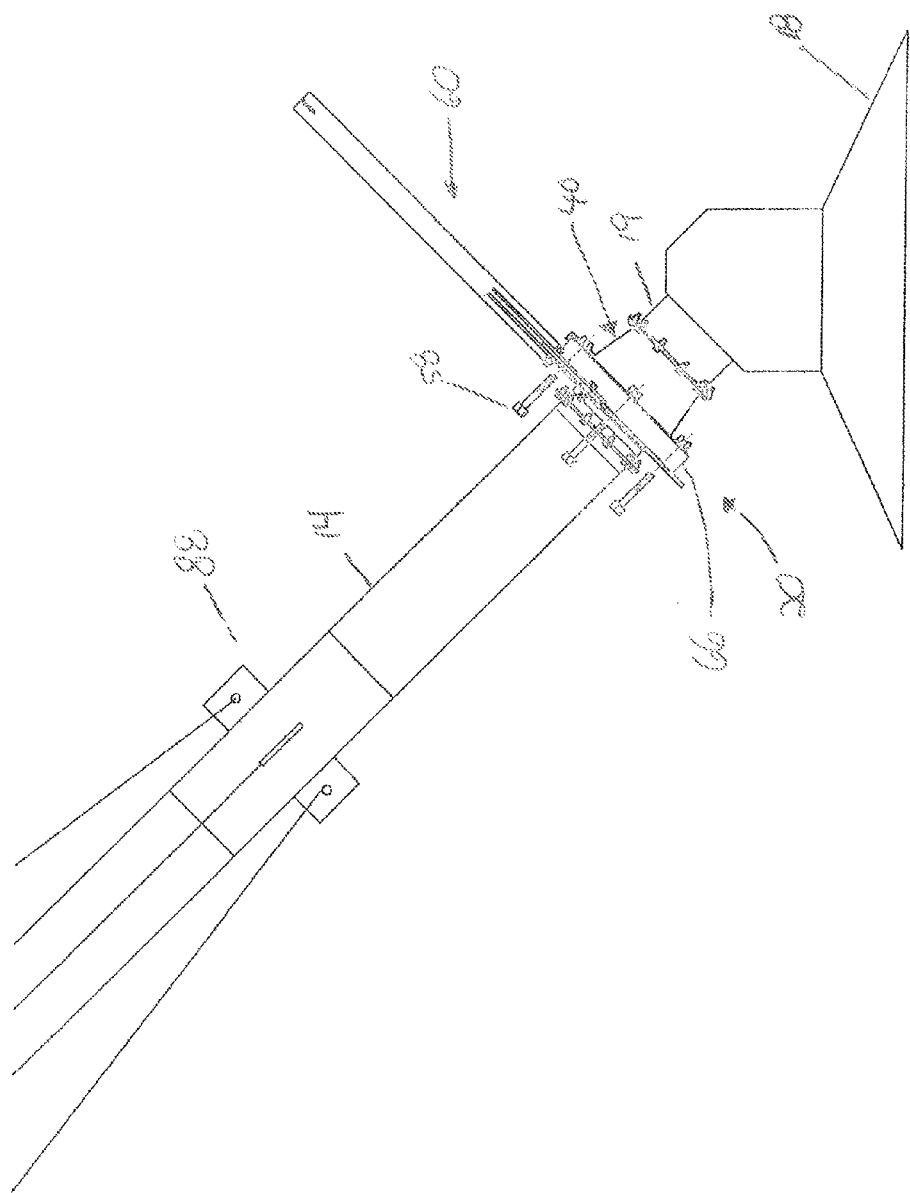
FIG. 3 is a side view showing an example of a first connection attached to a chute and a storage location.
Figure 4:
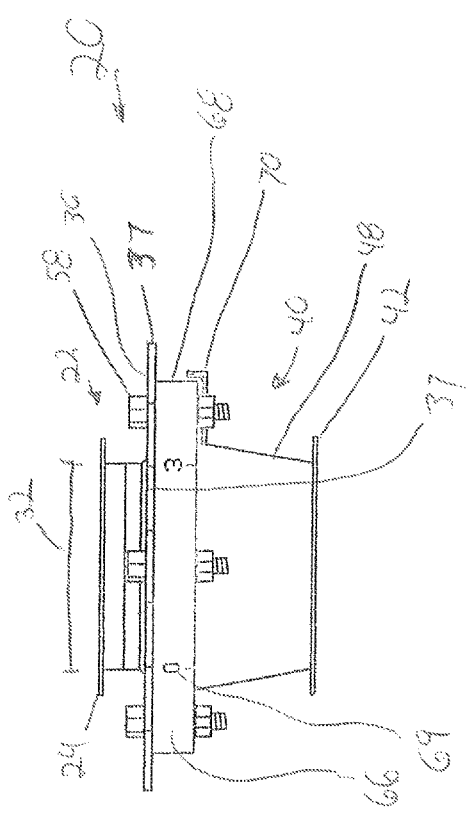
FIG. 4 is a side view of a first connection.
Figure 5:
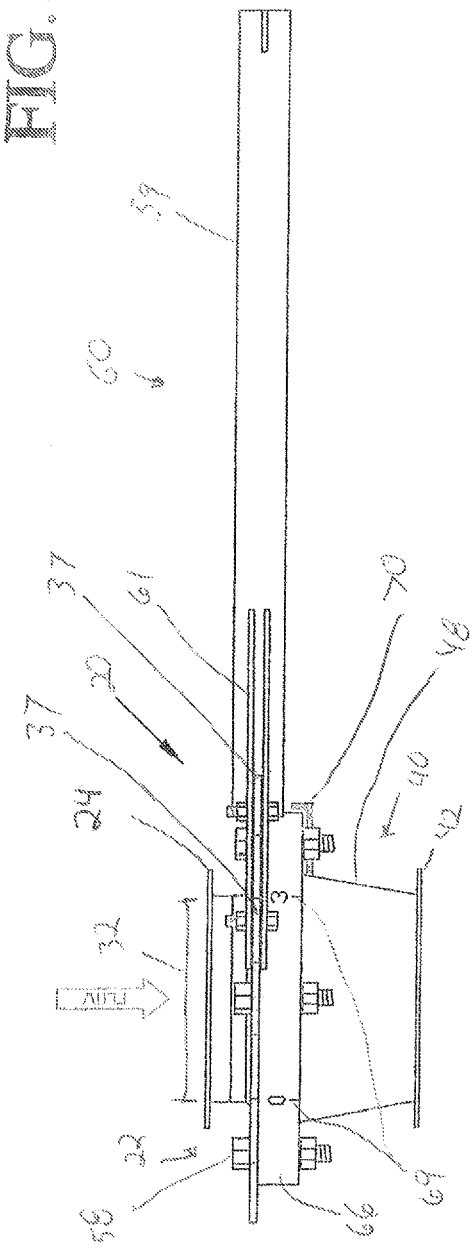
FIG. 5 is a side view of a rotary tool attached to a connection.
Figure 7:
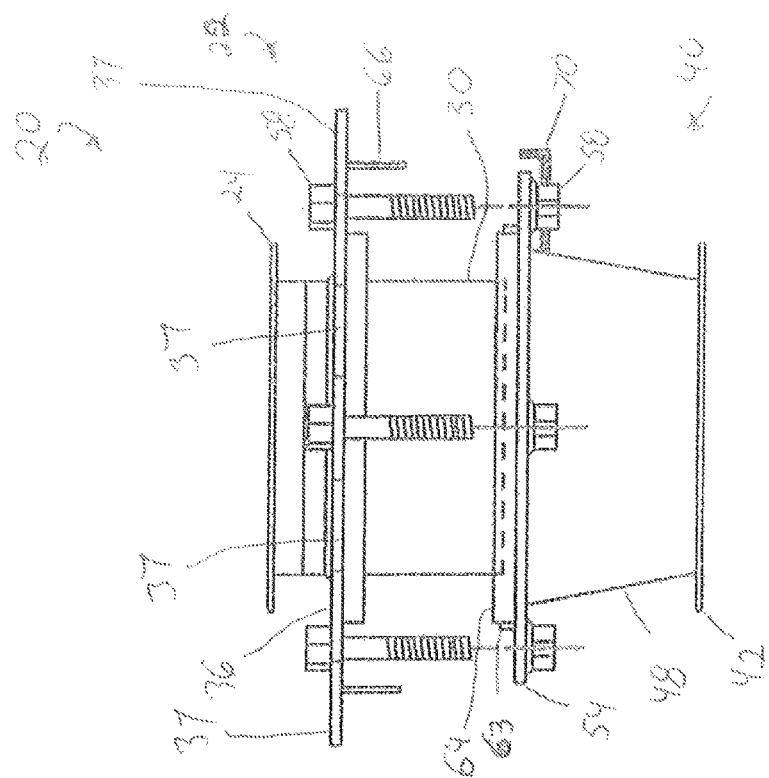
FIG. 7 is a side view similar to FIG. 6.
Figure 6:
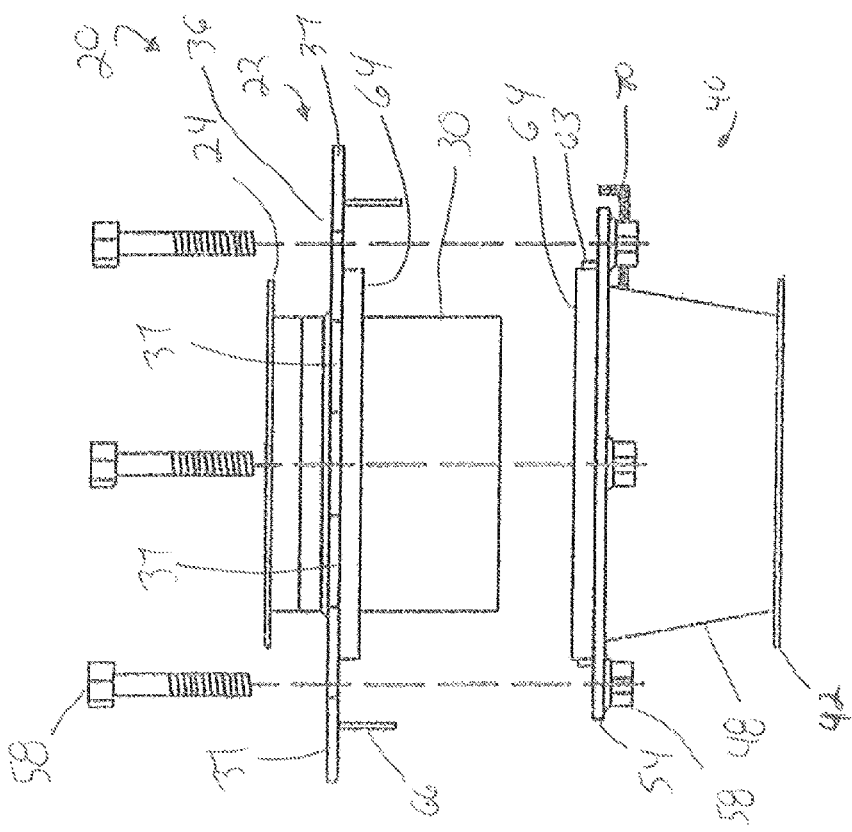
FIG. 6 is an expanded view of FIG. 4.
Figure 10:
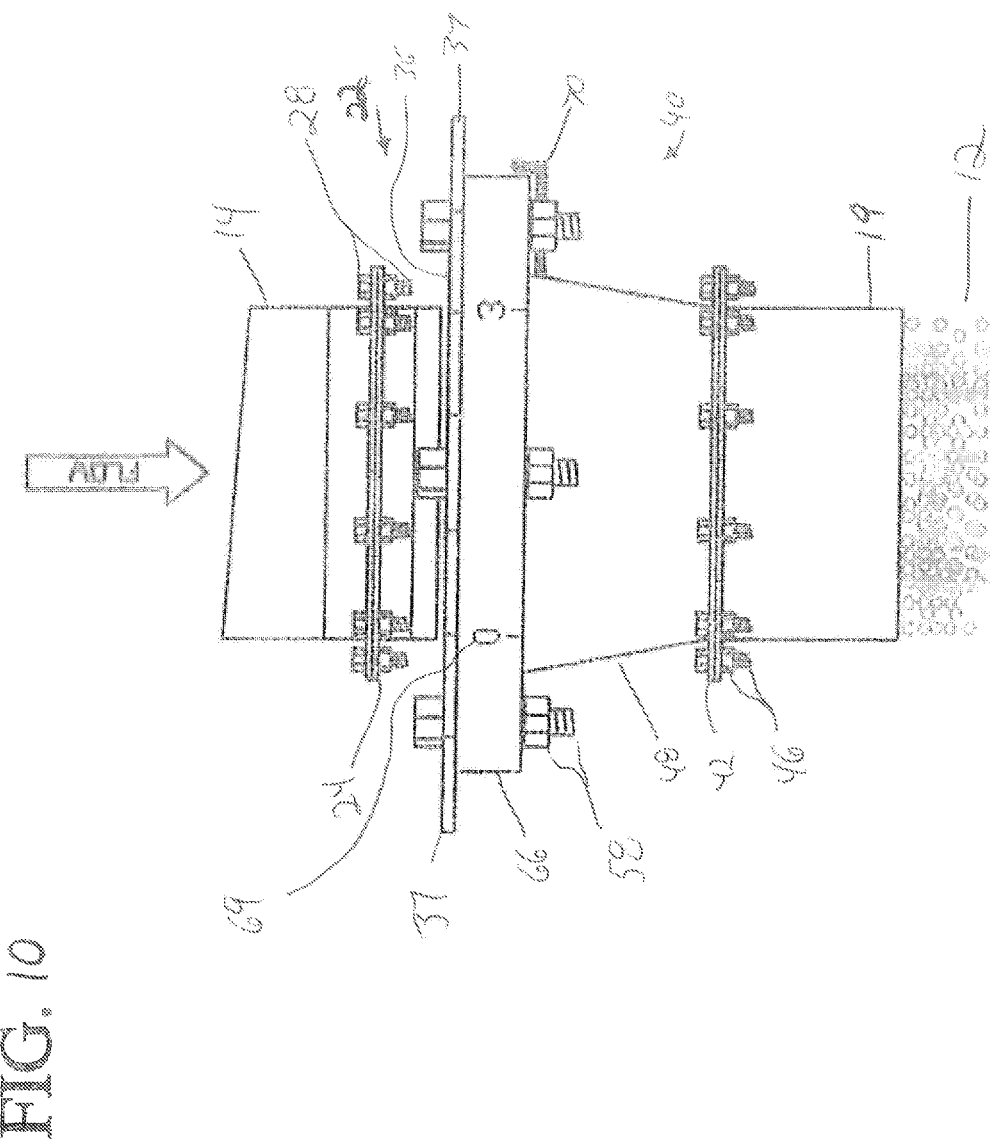
FIG. 10 is a side view of a first connection to a chute and a collection location.
Figure 11:
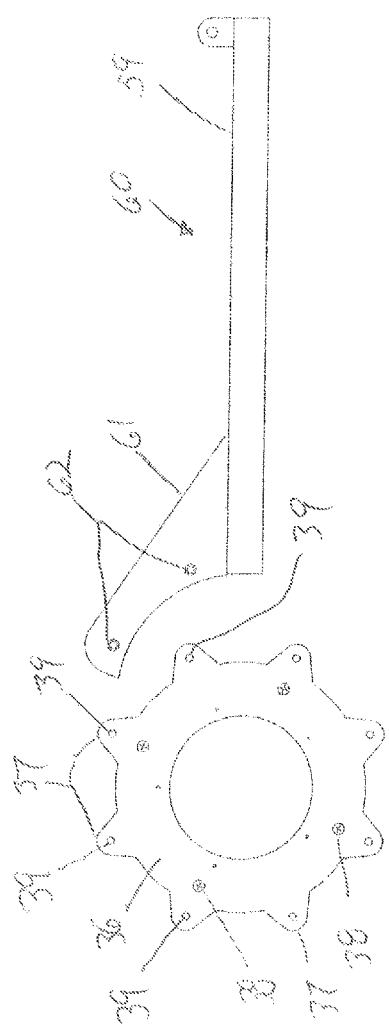
FIG. 11 is a top view showing a top annular plate and a rotary tool.
Figure 12:
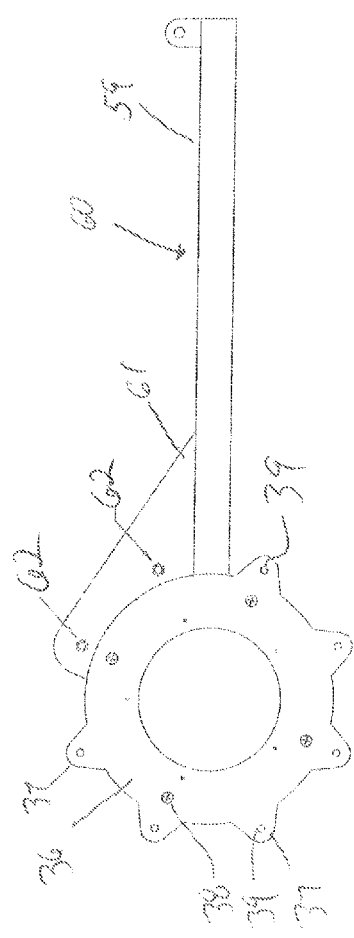
FIG. 12 is a top view similar to FIG. 11 showing an attachment at the top annular plate and the rotary tool.
Figure 13:
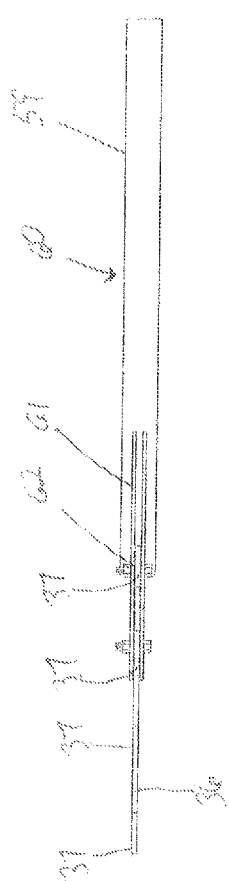
FIG. 13 is a side view of FIG. 12.
Figure 16:
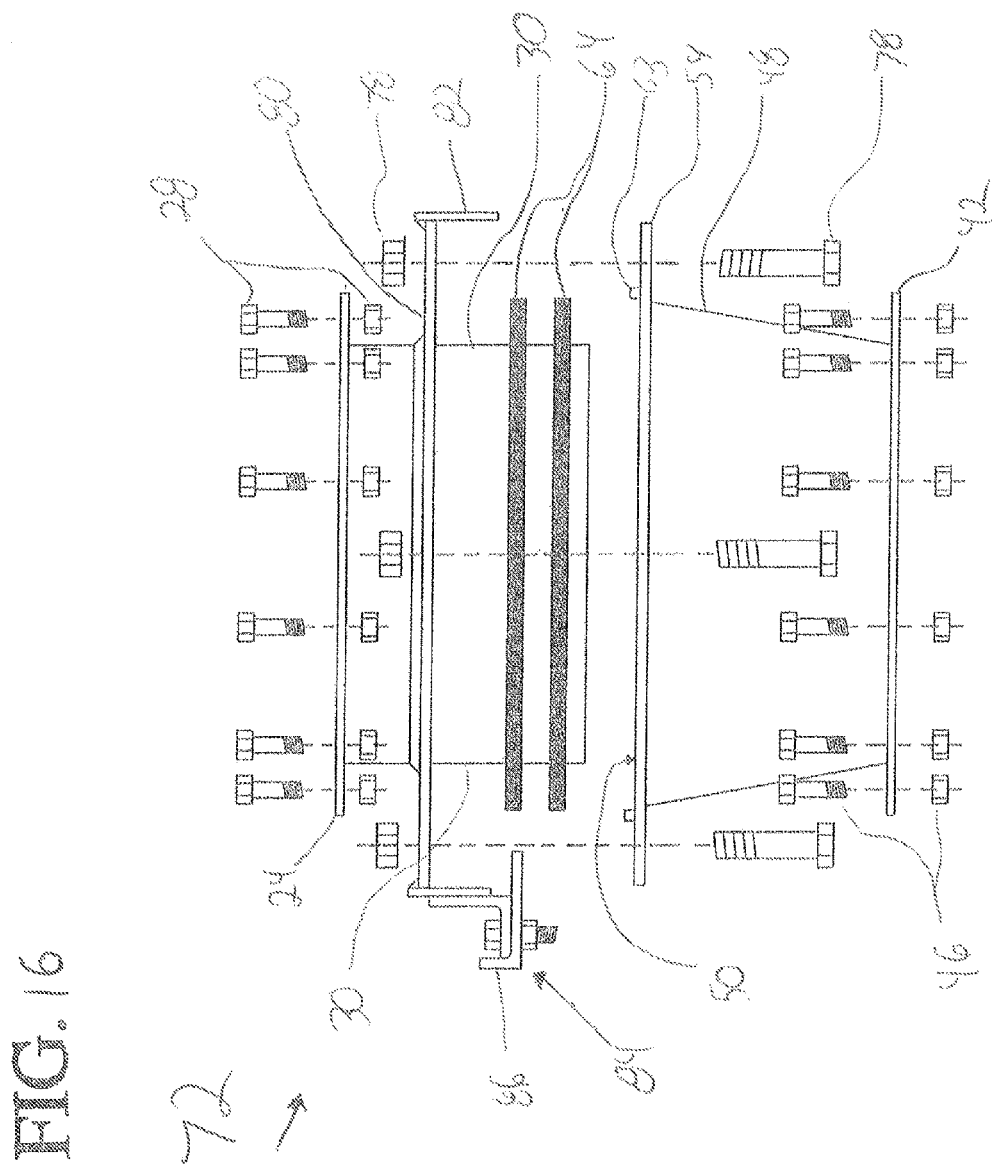
FIG. 16 is a partial cutaway assembly view of a second connection made in accordance with the current disclosure.
Figure 17:
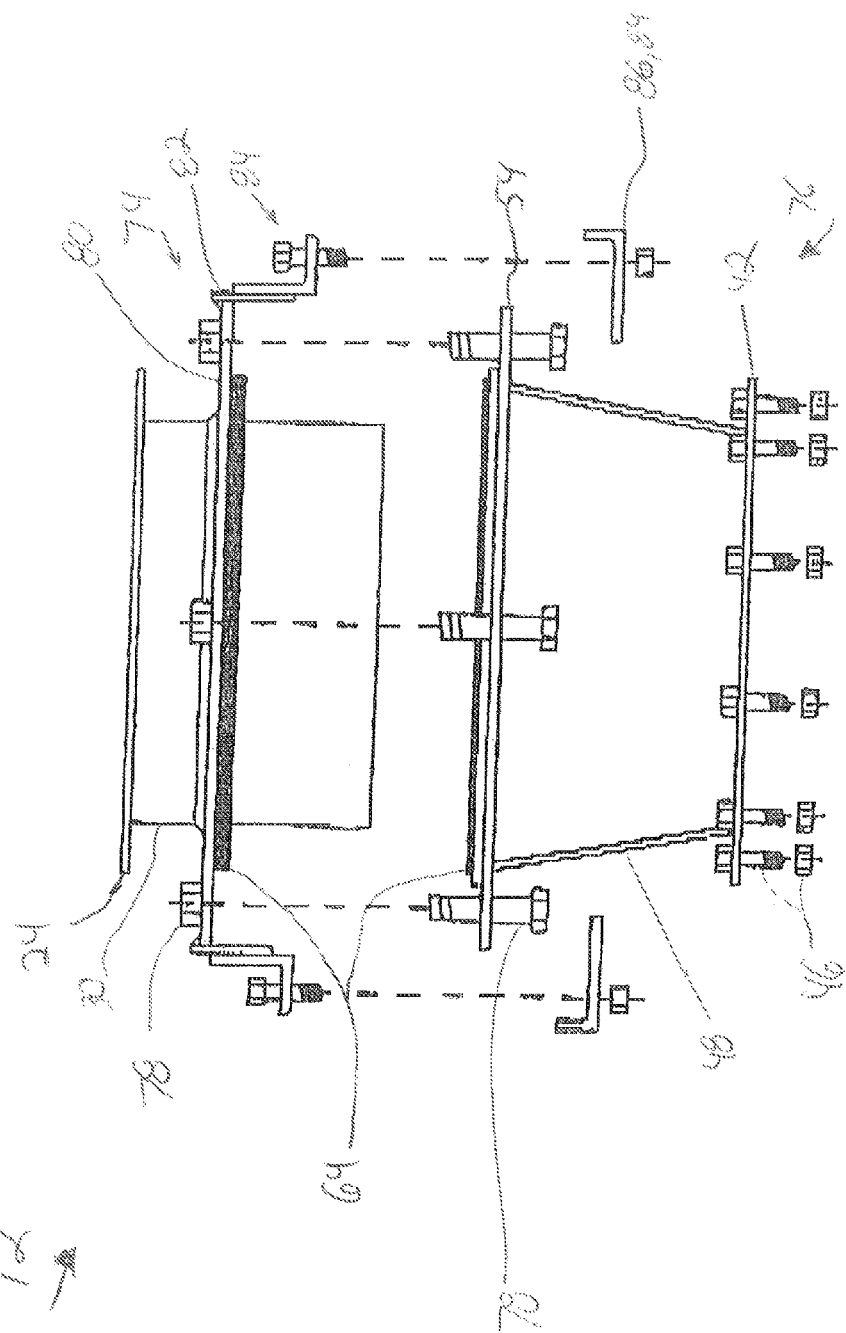
FIG. 17 is a partial cutaway assembly view of a second connection made in accordance with the current disclosure.
Figure 18:
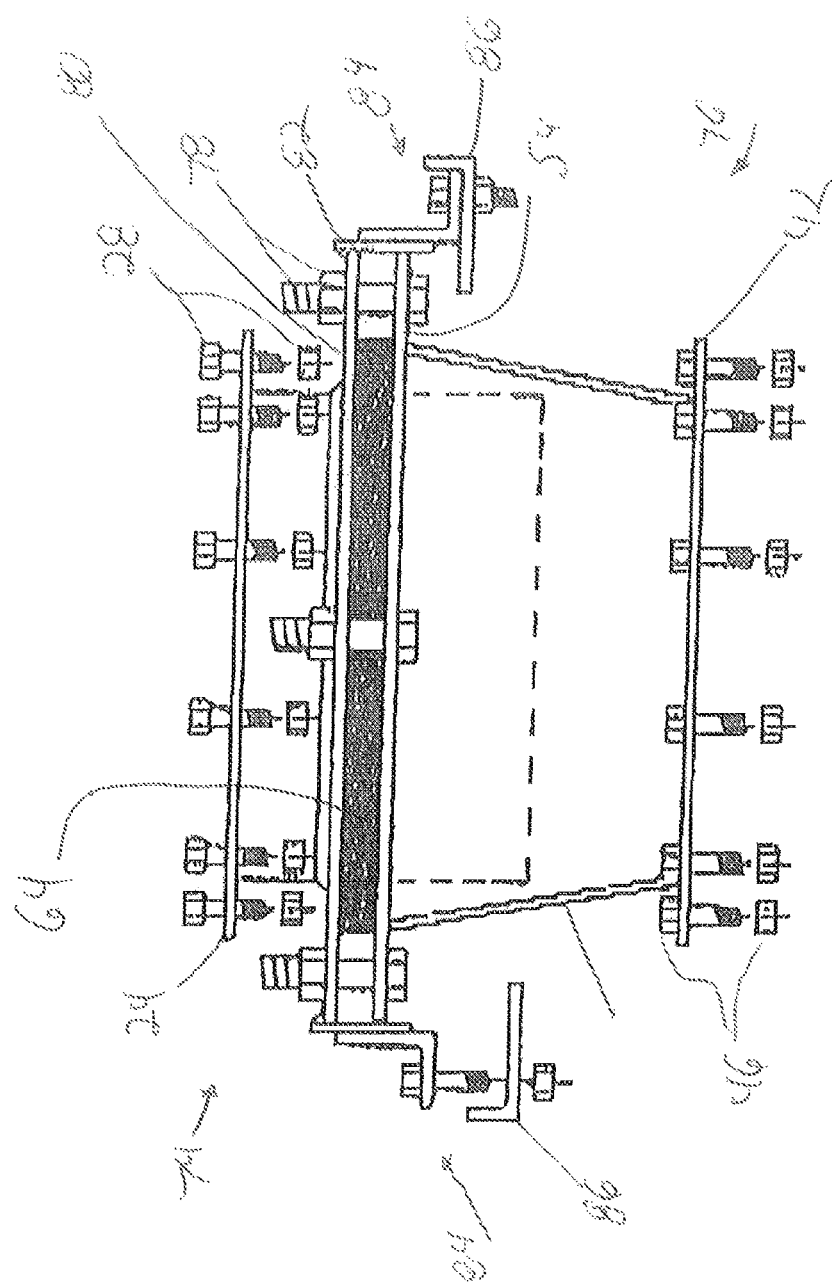
FIG. 18 is a partial cutaway view of a second connection made in accordance with the current disclosure.
Figure 19:
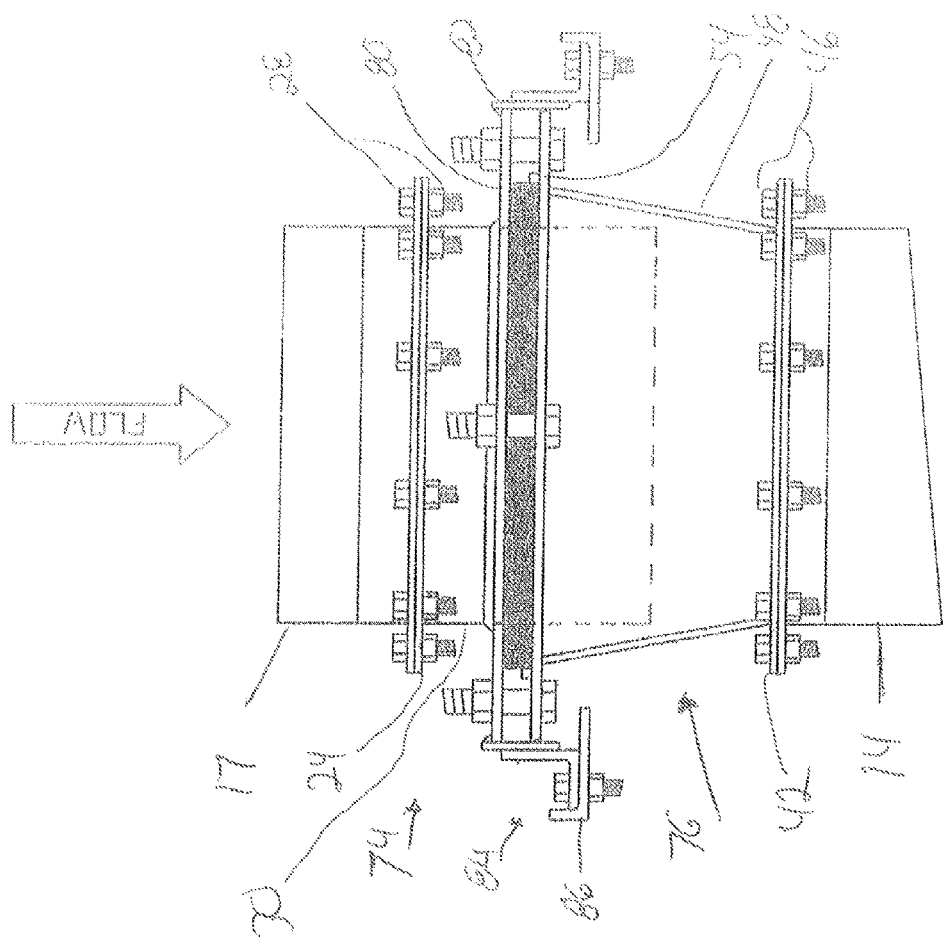
FIG. 19 is a partial cutaway view of a second connection shown attached to the chute and a distribution bin.
Figure 20A:
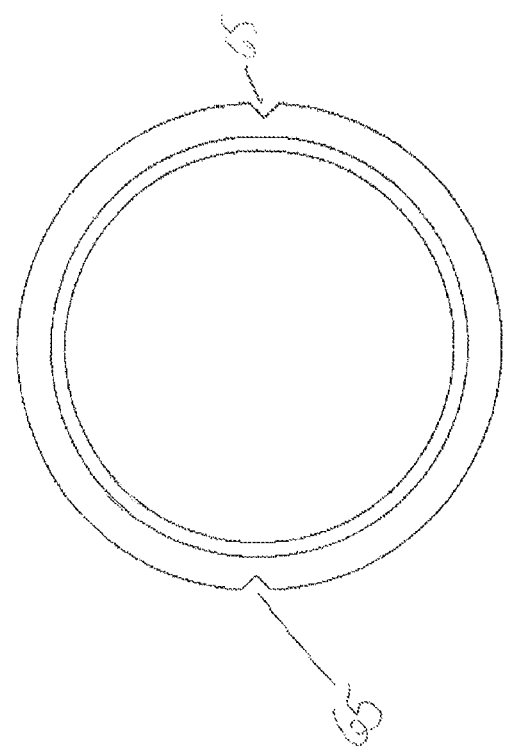
FIG. 20A is a top view of a thrust bearing used in connections in accordance with the current disclosure.
Figure 20B:
FIG. 20B is a side view of FIG. 20A.

Referring now generally to FIGS. 1-20B, an attachment system is shown and generally designated by the numeral 10. The attachment system is for the transfer of material 12 along a chute 14 from a first location 16 to a second location 18. The material 12 can be, for example, agricultural products and supplies such as grain, corn and other like matter. The chute 14 can include tube or other tube-like or chute-like structures.

The first location 16 is preferably at a first height while the second location 18 is preferably at a second height where the second height is typically lower than the first height, the heights measured from ground level. The first location 16 can be a distribution location 16, such as distribution bins and carriers, used in the agriculture industry to store and transfer agriculture products such as grain, corn, and the like. The second location is preferably a storage location, such as a storage bin, such as those used in the agriculture industry to store grain, corn, and like materials. The distribution location 16 can include a distribution device 17 used to attach to a portion of the attachment system 10. The distribution device 17 can be items known in the art, such as a rotating head or other attachment device, through which the material 12, such as grain, flows in order to enter the chute 14. Likewise, the second location 18, or storage bin 18, can include a receiving end 19 designed to allow passage of the material 12 exiting the chute 14 to enter into the storage bin 18.

In a preferred embodiment, the attachment system 10 includes a first connection 20, which can also be described as a storage bin connection 20 that includes a top housing 22 and a bottom housing 40. The top housing 22 can include a top collar 24 that includes a plurality of top collar attachment holes 26. Each one of a plurality of top fasteners 28 can be shaped to engage one of the top collared attachment holes 26. The top fasteners 28 and top collar attachment holes 26 can removably secure and attach the top collar 24 to the chute 14. A top tubular section 30 extends from the top collar 24 and can be formed as one single piece or the top tubular section 30 and top collar 24 can be affixed together by conventional means, such as welding. The top tubular section 30 includes a first diameter 32 and an axis 34. A top annular plate 36 is affixed to the top tubular section 30 at a position that is spaced from the top collar 24. The top annular plate 36 includes a plurality of top housing attachment apertures 38 and a plurality of protrusions 37 spaced about the top annular plate 36. The protrusions 37 extend radially outward from the axis 34 and include tool holes 39.

The bottom housing 40 of the first connection 20 can include a bottom collar 42 with bottom collar attachment holes 44. Each one of a plurality of bottom fasteners 46 are shaped to engage one of the bottom collar attachment holes 44 to removably attach and secure the bottom collar 42 to the second location 18, or storage bin 18. A bottom tubular section 48 extends from the bottom collar 42 and includes a mouth 50 positioned opposite the bottom collar 42. The bottom tubular section 48 is preferably frustoconical in shape from the mouth 50 to the bottom collar 42. The bottom tubular section 48 and bottom collar 42 can be a single piece but can also be attached using conventional methods, such as welding. The mouth 50 has a second diameter 52 that is larger than the first diameter 32 wherein at least a portion of the top tubular section 30 is positionable within the mouth 50 of the bottom tubular section 48 when the top housing 22 is received within the bottom housing 40. A bottom annular plate 54 is affixed to the bottom tubular section 48 and spaced from the bottom collar 42. The bottom annular plate 54 includes a plurality of bottom housing attachment apertures 56 and is preferably positioned proximate the mouth 50.

A plurality of connecting fasteners 58 is included such that each connecting fastener 58 is shaped to engage one of the top housing attachment apertures 30 and one of the bottom housing attachment apertures 56 to removably attach the top annular plate 36 to the bottom annular plate 54. This removable attachment also removably secures the top housing 22 to the bottom housing 40. This removable attachment allows rotation of the top housing 22 along with the top collar 24, top tubular section 30, and top annular plate 36 relative to the bottom housing 40 and the included bottom collar 42, bottom tubular section 48 and bottom annular plate 54.

A rotary tool 60 is included. The rotary tool 60, which can also be described as a turning tool or turning handle, includes a plurality of securing locations 62 shaped to removably engage the plurality of protrusions 37 of the top annular plate 36 and more specifically one of the tool holes 39. The rotary tool is shaped to rotate the top housing 22 independent of the bottom housing 40 absent the connecting fasteners 58 securing the top annular plate 36 to the bottom annular plate 54. The rotary tool 60 can include a handle 59 and a flange 61 with each of the securing locations 62 positioned on the flange 61 to independently engage at least one of the tool holes 39 on one of the protrusions 37 of the top annular plate 36. This connection can be facilitated by fasteners as known in the art, such as bolts and nuts, clamps, and the like.

The first connection 20 can further include a thrust bearing 64, which can be described as a washer 64, positioned between the top annular plate 36 and the bottom annular plate 54 when the connecting fasteners 58 attach the top annular plate 36 to the bottom annular plate 54. This thrust bearing 64 is positioned to facilitate the rotation of the top housing 22 relative to the bottom housing 40 by reducing the friction between the top annular plate 36 and the bottom annular plate 54. In a preferred embodiment there are two thrust bearings 64 positioned between the top annular plate 36 and bottom annular plate 54. The thrust bearings 64 can be made of materials known in the art to facilitate this reduced friction rotational movement. For example, the thrust bearings can be made of a plastic material, such as high density polyurethane plastic and the like. Additionally, the thrust bearings have an internal diameter sized to allow the top tubular section 30 to pass within this internal diameter to facilitate the positioning of the top tubular section 30 within the mouth of the bottom tubular section 48.

The thrust bearing 64 can include one or more notches 65 that are positioned to engage stanchions 63 on the bottom annular plate 54. These notches 65 and stanchions 63 maintain the rotational position of the thrust bearings 64 when the chute 14 is rotated by the rotary tool 60. This further facilitates an ease in rotation of the chute for proper positioning in accordance with the attachment system 10. The thrust bearing 64 can include a reduced diameter portion 67 that can sit in the mouth 50 to further facilitate rotation of the chute 14.

Preferably the bottom annular plate 54 is affixed to the mouth 50 of the bottom tubular section 48 while the bottom collar 42 is affixed opposite the bottom annular plate 54. The spacing allows a portion of the top tubular section 30 to enter the mouth 50 and extend a distance within the bottom tubular section 48. Correspondingly, the top annular plate 36 is attached to the top tubular section 30 that allows a portion of the top tubular section 30 to enter the mouth 50 of the bottom tubular section and extend within the length of the bottom tubular section 48. This facilitates a transfer of the material 12 from the chute 14 into the top housing 22 and through the bottom housing 40 and into the storage bin 18. The top collar 24 is spaced from the top annular plate 36 to provide room for the attachment and removal of both the top fasteners 28 and connecting fasteners 58 during the assembly and use of the first connection 20.

Also included is a protective ring 66, which can be described as a dust cover ring, that extends from the top annular plate 36. The protective ring 66 preferably extends to the bottom annular plate 54 when the plurality of connecting fasteners 58 attach to the top annular plate 36 to the bottom annular plate 54. This protective ring 66 is sized to substantially cover the thrust bearing 64 and the overlapped portion of the mouth 50 around the top tubular section 30. The protective ring 66 can include an outside circumference 68 having graduated markings 69 positioned to indicate a rotational position of the top housing 22 in relation to the bottom housing 40. These graduated markings 69 facilitate the rotational positioning of the top housing 20 and, by its affixed connection to the chute 14, the location of the chute 14. This positioning of the chute dictates which potion of the internal diameter of the chute 14 engages the material 12 as the material 12 travels the chute 14.

These graduated markings 69 allow a user of the attachment system to accurately rotate the chute 14 around its axis to even the wear on the internal diameter of the chute 14 as caused by the material 12 during use of the chute 14 to transport that material 12 from the distribution location 16 to the storage bin 18. A indicating marker 70 can be attached to the bottom housing 40, and more specifically to the bottom tubular section 48, to facilitate the positioning of the top housing 22 in relation to the bottom housing 40 as the top housing 22 is rotated by the rotary tool 60. This indicating marker 70 can hold a fixed position such that the movement of the graduated markings 69 of the protective ring 66 is visually confirmed during the rotation of the top housing 22 by the rotary handle 60. This visual confirmation also indicates the rotation of the attached chute 14 because of the fixed relationship of the top housing 22 and the chute 14 to their shared axis.

The protective ring 66 can form a seal between the top annular plate 36 and bottom annular plate 54 to further protect the interaction between the top housing 22 and bottom housing 40 as well as protect the material 12 from external influences such as weather and animals.

In another embodiment, the attachment system 10 can include a second connection 72 wherein the second connection 72 is designed similar to the first connection 20. The second connection 72 can include a top housing 74, bottom housing 76 and connecting fasteners 78 similar to the top housing 22, bottom housing 40 and connecting fasteners 58 as previously described. The second connection 72 can be designed such that the bottom housing 76 connects to the chute 14 while the top housing 74 connects to the distribution location 16. This connection 72 can be designed such that absent the connecting fasteners 78, the top housing 74 and bottom housing 76 can rotate independently from the force exerted by the rotary tool 60. The top housing 74 can include a top annular plate 36 as previously described or alternately can include an annular plate 80 that lacks the protrusions 37 as previously described. Additionally, the second connection 72 can include a protective ring 66 as previously described. Alternately, the second connection 72 can include a protective ring 82 that can form a seal between the top housing 74 and bottom housing 76 but is absent the graduated markings 69.

Additionally, the second connection 72 can include a safety device 84 that can attach to the top housing 74 to maintain a relative relation between the top housing 74 and the bottom housing 76 when the connecting fasteners 78 are removed. For example, this safety device 84 can extend from the protective ring 82 or the annular plate 80 such that the safety device 84 restricts the movement of the bottom housing 76 away from the top housing 74 when the connecting fasteners 78 are removed. The safety device 84 can have an extension 86, or a lip 86, that engages the bottom annular plate 54 of the bottom housing 76 when the connecting fasteners 78 are removed.

In this embodiment, the bottom annular plate 54 of the bottom housing 76 has limited linear movement along the axis of the second connection 72 wherein the connecting fasteners 78 are removed. This allows a limited separation between the annular plate 80 of the top housing 74 and the bottom annular plate 54 of the bottom housing 76 to facilitate rotation of the top housing 74 relative to the bottom housing 76 while protecting from a complete disassociation and dropping of the bottom housing 76 from the proximity of the top housing 74 when the connecting fasteners 78 are removed. This essentially keeps the bottom housing 76 and its attached chute 14 from falling to the ground when the connecting fasteners 78 are removed. The safety device 84 can also be described as a secondary securing device 84.

Alternately, the second connection 72 can have the top annular plate as previously described while the first connection 20 can have an annular plate 80 as described. More specifically, the top annular plate 36 as described could be affixed to the bottom housing 76 of the second connection 72. In this manner the rotary tool 60 could attach directly to that top annular plate 36 on the bottom housing 76 of the second connection 72 such that the rotor tool 60 could rotate the bottom housing 76, chute 14, and top housing 22 of the first connection 20 when the connecting fasteners 78 and 58 are removed.

In operation, the attachment system 10 facilitates connection from a distribution location 16 to a storage bin 18. When the bottom of the chute 14, or the internal portion of the chute 14 that consistently engages the material 12 wears by use over time, the attachment system 10 can be used to rotate that contact location between the material 12 and the chute 14. This effectively prolongs the life of the chute 14. This rotation can occur by the removal of the connecting fasteners 58 and 78 at the first connection 20 and second connection 72, respectively. This effectively disengages the top housing 22 from the bottom housing 40 of the first connection 20 and the top housing 74 from the bottom housing 76 of the second connection 72.

In practice, the bottom housing 76 of the second connection 72 is attached to the chute 14 with the chute 14 attached to the top housing 22 of the second connection 20. The rotary tool 60 can then be used to rotate the top housing 22 chute 14 and bottom housing 76 to reposition the contact area within the chute 14 for the material 12. The connecting fasteners 58 and 78 can then engage and affix the top and bottom housings of the first and second connections such that the chute and first and second connections are again attached and secure. The material 12 can then continue its path from the distribution location 16 to the storage bin 18. Again, this controlled rotation of the chute 14 is facilitated by a protective ring 16 and more specifically by the graduate markings 69 and indicating marker 70.

The top annular plate 36 is shown with eight of the protrusions 37 and four of the top housing attachment apertures 38. While this number may be preferred, other numbers are possible and are within the scope of this disclosure. For example, the top housing attachment apertures 38 can number anywhere from two or more with the purpose of securely attaching the top housing 22 to the bottom housing 40 and allowing multiple rotational positioning of the top housing 22 with respect to the bottom housing 40.

Absent the second connection 72, the first connection 20 can be used in conjunction with conventional connection methods known in the art to attach a chute 14 and a distribution location 16. For example, a slip ring can be used to attach the chute 14 and a distribution location 16 to facilitate movement of the material 12 from a distribution location 16 into the top of the chute 14. Additionally, the chute 14 can be support by other conventional support device 88 as known in the art.

Thus, although there have been described particular embodiments of the present invention of a new and useful Connection For A Grain Bin Allowing Rotation Of The Supply/Removal Chute it is not intended that such references be construed as limitations upon the scope of this invention except as set forth in the following claims.

What is claimed is:

1. An attachment system for the transfer of material along a chute from a first location at a first height to a second location at a second height, the attachment system comprising:
    a first connection including:
        a top housing having:
            a top collar including a plurality of top collar attachment holes;
            a plurality of top fasteners, each top fastener shaped to engage one of the top collar attachment holes and removably attach the top collar to the chute;
            a top tubular section extending from the top collar and having a first diameter and an axis; and
            a top annular plate fixed to the top tubular section and spaced from the top collar, the top annular plate including a plurality of top housing attachment apertures and a plurality of protrusions spaced around the top annular plate and extending radially outward from the axis;
        a bottom housing having:

a bottom collar including bottom collar attachment holes;

a plurality of bottom fasteners, each bottom fastener shaped to engage one of the bottom collar attachment holes and removably attach the bottom collar to the second location;

a bottom tubular section extending from the bottom collar and having a mouth positioned opposite the bottom collar, the mouth having a second diameter larger that the first diameter, wherein at least a portion of the top tubular section is positionable within the mouth of the bottom tubular section; and a bottom annular plate fixed to the bottom tubular section and spaced from the bottom collar, the bottom annular plate including a plurality of bottom housing attachment apertures;

a plurality of connecting fasteners, each connection fastener shaped to engage one of the top housing attachment apertures and one of the bottom housing attachment apertures to removably attach the top annular plate to the bottom annular plate; and a rotary tool having a plurality of securing locations shaped to removably engage the plurality of protrusions, the rotary tool shaped to rotate the top housing independent of the bottom housing absent the plurality of connecting fasteners between the top annular plate and the bottom annular plate.

2. The attachment system of claim 1, further including at least one thrust bearing positioned between the top annular plate and the bottom annular plate when the plurality of connecting fasteners attach the top annular plate to the bottom annular plate.

3. The attachment system of claim 2, further including two thrust bearings positioned between the top annular plate and the bottom annular plate when the plurality of connecting fasteners attach the top annular plate to the bottom annular plate.

4. The attachment system of claim 1, further including a protective ring extending from the top annular plate to the bottom annular plate when the plurality of connecting fasteners attach the top annular plate to the bottom annular plate.

5. The attachment system of claim 4, wherein the protective ring includes an outside circumference with graduate markings positioned to indicate a rotational position of the top housing in relation to the bottom housing.

6. The attachment system of claim 4, wherein the protective ring forms a seal between the top annular plate and the bottom annular plate.

7. The attachment system of claim 1, wherein the bottom housing is frustoconical in shape from the mouth to the bottom collar.

8. The attachment system of claim 1, wherein the rotary tool includes a handle and a flange extending from the handle, the each of the plurality of securing locations positioned on the flange to independently engage at least one of the plurality of protrusions of the top annular plate.

9. An attachment system for the transfer of material along a chute from a first location at a first height to a second location at a second height, the attachment system comprising:

a first connection including:

a top housing having a top collar shaped to engage the chute, a top tubular section extending from the top collar and having a first diameter and an axis, and a top annular plate fixed to the top tubular section and spaced from the top collar, the top annular plate including plurality of protrusions spaced around the top annular plate and extending radially outward from the axis;

a bottom housing having a bottom collar shaped to engage the second location, a bottom tubular section extending from the bottom collar and having a mouth positioned opposite the bottom collar, the mouth having a second diameter larger that the first diameter, wherein at least a portion of the top tubular section is positionable within the mouth of the bottom tubular section, and a bottom annular plate fixed to the bottom tubular section and spaced from the bottom collar; and a plurality of connecting fasteners, each connection fastener shaped to removably attach the top annular plate to the bottom annular plate;

a second connection including:

a top housing having a top collar shaped engage the first location, a top tubular section extending from the top collar and having a first diameter and an axis, and a top annular plate fixed to the top tubular section and spaced from the top collar;

a bottom housing having a bottom collar shaped engage the chute, a bottom tubular section extending from the bottom collar and having a mouth positioned opposite the bottom collar, the mouth having a second diameter larger that the first diameter, wherein at least a portion of the top tubular section is positionable within the mouth of the bottom tubular section, and a bottom annular plate fixed to the bottom tubular section and spaced from the bottom collar; and a plurality of connecting fasteners, each connection fastener shaped to removably attach the top annular plate to the bottom annular plate; and a rotary tool having a plurality of securing locations shaped to removably engage the plurality of protrusions, the rotary tool shaped to rotate the top housing of the first connection independent of the bottom housing of the first connection and the bottom housing of the second connection independent of the top housing of the second connection absent the plurality of connecting fasteners attaching the top annular plate to the bottom annular plate of each connection.

10. The attachment system of claim 9, further including at least one thrust bearing positioned between the top annular plate and the bottom annular plate of each connection when the plurality of connecting fasteners attach the top annular plate to the bottom annular plate.

11. The attachment system of claim 10, further including two thrust bearings positioned between the top annular plate and the bottom annular plate of each connection when the plurality of connecting fasteners attach the top annular plate to the bottom annular plate.

12. The attachment system of claim 9, further including a protective ring on each connection extending from the top annular plate to the bottom annular plate when the plurality of connecting fasteners attach the top annular plate to the bottom annular plate.

13. The attachment system of claim 12, wherein at least one of the protective rings includes an outside circumference with graduate markings positioned to indicate a rotational position of the top housing in relation to the bottom housing.

14. The attachment system of claim 12, wherein each protective ring forms a seal between the top annular plate and the bottom annular plate of said connection.

15. The attachment system of claim 9, wherein the bottom housing of each connection is frustoconical in shape from the mouth to the bottom collar.

16. The attachment system of claim 9, wherein the rotary tool includes a handle and a flange extending from the handle, the each of the plurality of securing locations positioned on the flange to independently engage at least one of the plurality of protrusions of the top annular plate.

17. The attachment system of claim 9, the second connection further including at least one secondary securing device positioned to limit the axial movement of the top housing relative to the bottom housing in the second connection.

18. An attachment system for the transfer of material along a chute from a distribution device to a storage bin, the attachment system comprising:
  a storage bin connection including:
    a top housing having a top collar shaped to engage the chute, a top tubular section extending from the top collar and having a first diameter and an axis, and a top annular plate fixed to the top tubular section and spaced from the top collar, the top annular plate including plurality of protrusions spaced around the top annular plate and extending radially outward from the axis;
    a frustoconical shaped bottom housing having a bottom collar shaped to engage the storage bin, a bottom tubular section extending from the bottom collar and having a mouth positioned opposite the bottom collar, the mouth having a second diameter larger that the first diameter, wherein at least a portion of the top tubular section is positionable within the mouth of the bottom tubular section, and a bottom annular plate fixed to the bottom tubular section and spaced from the bottom collar;
    a plurality of connecting fasteners, each connection fastener shaped to removably attach the top annular plate to the bottom annular plate;
    at least one thrust bearing positioned between the top annular plate and the bottom annular plate when the plurality of connecting fasteners attach the top annular plate to the bottom annular plate; and
    a protective ring extending from the top annular plate to the bottom annular plate when the plurality of connecting fasteners attach the top annular plate to the bottom annular plate, the protective ring including an outside circumference with graduate markings positioned to indicate a rotational position of the top housing in relation to the bottom housing;
  a distribution connection including:
    a top housing having a top collar shaped engage the distribution device, a top tubular section extending from the top collar and having a first diameter and an axis, and a top annular plate fixed to the top tubular section and spaced from the top collar;
    a frustoconical shaped bottom housing having a bottom collar shaped engage the chute, a bottom tubular section extending from the bottom collar and having a mouth positioned opposite the bottom collar, the mouth having a second diameter larger that the first diameter, wherein at least a portion of the top tubular section is positionable within the mouth of the bottom tubular section, and a bottom annular plate fixed to the bottom tubular section and spaced from the bottom collar;
    a plurality of connecting fasteners, each connection fastener shaped to removably attach the top annular plate to the bottom annular plate;
    at least one thrust bearing positioned between the top annular plate and the bottom annular plate when the plurality of connecting fasteners attach the top annular plate to the bottom annular plate;
    a protective ring extending from the top annular plate to the bottom annular plate when the plurality of connecting fasteners attach the top annular plate to the bottom annular plate; and
    at least one secondary securing device positioned to limit the axial movement of the top housing relative to the bottom housing; and
  a turning tool having a plurality of securing locations shaped to removably engage the plurality of protrusions, the turning tool shaped to rotate the top housing of the storage bin connection independent of the bottom housing of the storage bin connection and the bottom housing of the distribution connection independent of the top housing of the distribution connection absent the plurality of connecting fasteners attaching the top annular plate to the bottom annular plate of each connection.

\* \* \* \* \*